US007241091B1

(12) United States Patent
Yang

(10) Patent No.: US 7,241,091 B1
(45) Date of Patent: Jul. 10, 2007

(54) DECORATION-USED MOLD UNIT

(76) Inventor: Kun-Ying Yang, No. 103, Singjhong St., Central District, Taichung City 400 (TW)

( * ) Notice: Subject to any disclaimer, the term of this patent is extended or adjusted under 35 U.S.C. 154(b) by 0 days.

(21) Appl. No.: 11/473,231

(22) Filed: Jun. 23, 2006

(51) Int. Cl.
*B23C 1/20* (2006.01)
*B23C 3/00* (2006.01)
*B27C 5/10* (2006.01)

(52) U.S. Cl. ...................... 409/178; 409/130; 409/143; 409/180; 408/103; 408/115 R; 144/27; 144/144.51; 144/144.52; 144/136.95; 33/638; 33/194; 33/562; 33/197

(58) Field of Classification Search ................ 409/180, 409/178–179, 181–182, 130, 138, 143, 125; 408/103, 115 R; 144/27, 144.1, 136.95, 144/371, 372, 144.51, 144.52, 154.5; 33/194, 33/562, 638, 642, 197
See application file for complete search history.

(56) References Cited

U.S. PATENT DOCUMENTS 2,605,790 A * 8/1952 Schwarzer ................... 144/27
3,212,366 A * 10/1965 Russell et al. .............. 408/103
4,074,736 A * 2/1978 Wolff .................... 144/144.51
4,194,861 A * 3/1980 Keller .................... 408/115 R
4,235,268 A * 11/1980 Savary ........................ 144/27
4,306,823 A * 12/1981 Nashlund ............... 144/144.52
4,445,277 A * 5/1984 Keefe .......................... 33/197
4,594,032 A * 6/1986 Warburg ................. 408/115 R
4,648,433 A * 3/1987 Wolff .................... 144/144.52
4,715,125 A * 12/1987 Livick .................... 408/115 R
5,067,537 A * 11/1991 Offner ........................ 144/372
5,114,285 A * 5/1992 Brydon ................... 408/115 R
D356,271 S * 3/1995 Adamik et al. .............. D10/62
5,511,312 A * 4/1996 Hobbs ......................... 144/27
5,573,352 A * 11/1996 Matadobra .................. 409/178
7,101,123 B1 * 9/2006 Weinstein et al. .......... 408/103

FOREIGN PATENT DOCUMENTS

GB 2219763 A * 12/1989

* cited by examiner

*Primary Examiner*—Erica Cadugan
(74) *Attorney, Agent, or Firm*—Rosenberg, Klein & Lee

(57) ABSTRACT

A decoration-used mold unit for defining a border on a work piece to facilitate cutting or milling. The mold unit includes an elongated rectangular main body formed with a first window for processing a first sink and a second window for processing a second sink. A first chucking section protrudes from a first side of the main body. A second chucking section protrudes from a second side of the main body. At least one abutting member is adjustably arranged at the second chucking section. The first chucking section and the abutting member respectively abut against two opposite sides of the work piece to clamp the work piece. In the processing procedure, the blade is restricted within the first and second windows so that the work piece will not be over-milled and the borders of the sinks keep straight.

6 Claims, 5 Drawing Sheets

DECORATION-USED MOLD UNIT

BACKGROUND OF THE INVENTION

The present invention is related to a decoration-used mold unit for defining a border on a work piece to facilitate cutting or milling. In the milling procedure, the blade is restricted within a certain range without over-cutting the work piece.

In decoration, when installing a wooden door, it is necessary for a carpenter to use a chisel to chisel the door to form desired channels or sinks for mounting a lock and a bolt.

Please refer to FIG. 5. A carpenter first marks the boarder 8 of the installation region of the lock on the door and then uses the chisel 7 to chisel the border 8. Then the region within the border 8 is chiseled by a certain thickness to form a sink 81 in accordance with the bolt. However, during the chiseling, a certain thickness 82 must be reserved near the face of the door to keep the door face tidy.

The border is manually chiseled one by one with the chisel 7. It is so hard to have the border straight. As a result, it often takes place that the lock or the bolt cannot be snugly installed into the sink 81. Under such circumstance, the carpenter needs to repeatedly fix the border. This is quite time-consuming and laborious. Moreover, it often takes place the thickness 82 between the door face and the sink 81 is incautiously broken by the worker when fixing the border. Under such circumstance, it is necessary to reinforce the thickness 82. This will waste the working time and affect the working quality.

SUMMARY OF THE INVENTION

It is therefore a primary object of the present invention to provide a decoration-used mold unit for defining a border on a work piece to facilitate cutting or milling. In the milling procedure, the blade is restricted within a certain range without over-cutting the work piece.

It is a further object of the present invention to provide the above decoration-used mold unit which can cooperate with an electric or a pneumatic miller to enhance the processing efficiency and promote the quality of the product.

According to the above objects, the decoration-used mold unit of the present invention includes an elongated rectangular main body having a top face and a bottom opposite to the top face. The main body also has a first side and a second side opposite to each other. The top and bottom faces are bridged between the first and second sides. The main body is formed with a first window for processing a first sink and a second window for processing a second sink. A first chucking section protrudes from the bottom face in a position adjacent to the first side. A second chucking section protrudes from the bottom face in a position adjacent to the second side. The second chucking section is formed with a notch communicating with the first window. At least one abutting member is screwed through the second chucking section. The first chucking section and the abutting member respectively abut against two opposite sides of the work piece to fix the main body with the work piece.

The present invention can be best understood through the following description and accompanying drawings wherein:

DETAILED DESCRIPTION OF THE PREFERRED EMBODIMENTS

Figure 1:
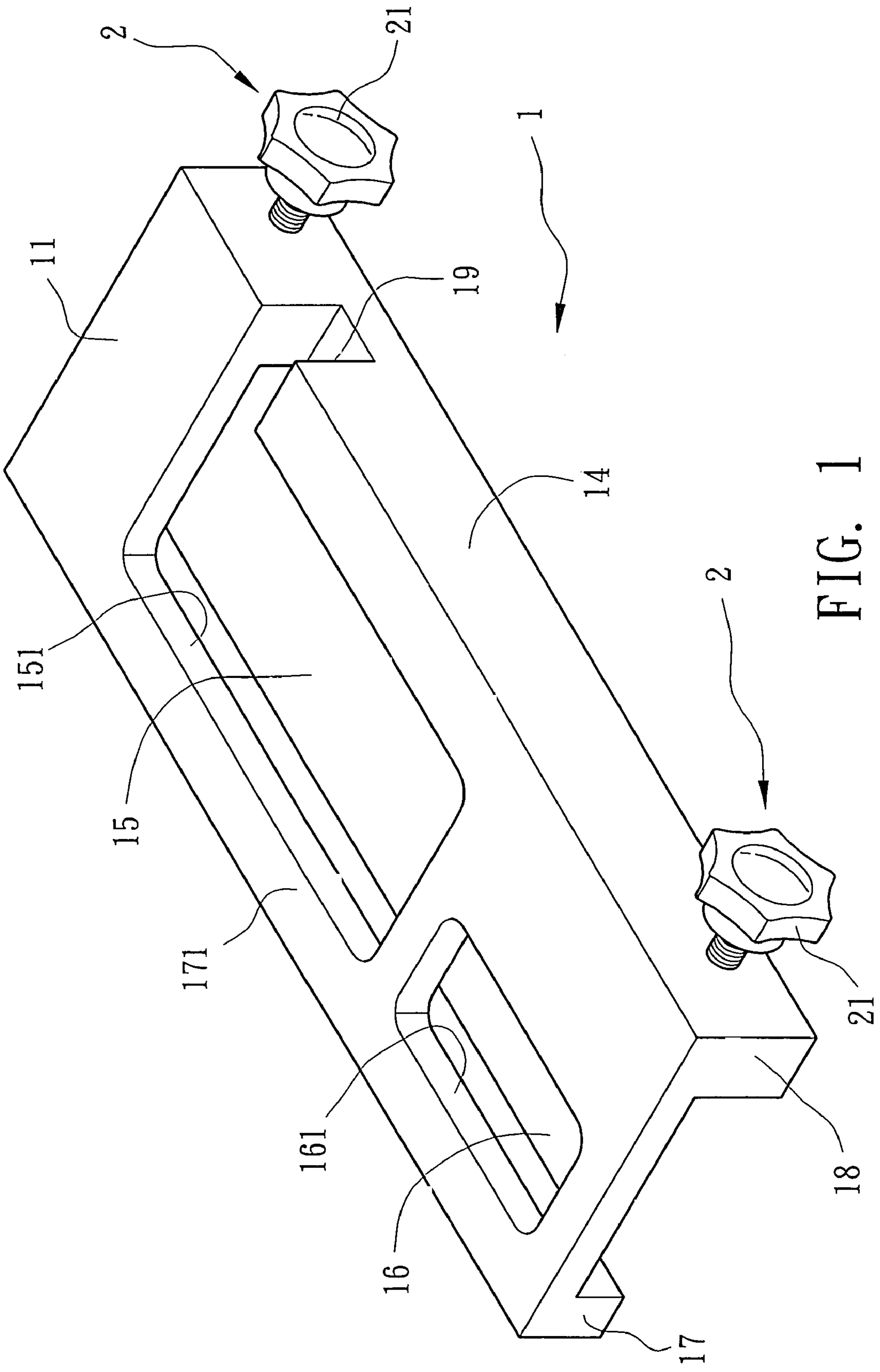
FIG. 1 is a perspective view of the present invention.
Figure 2:
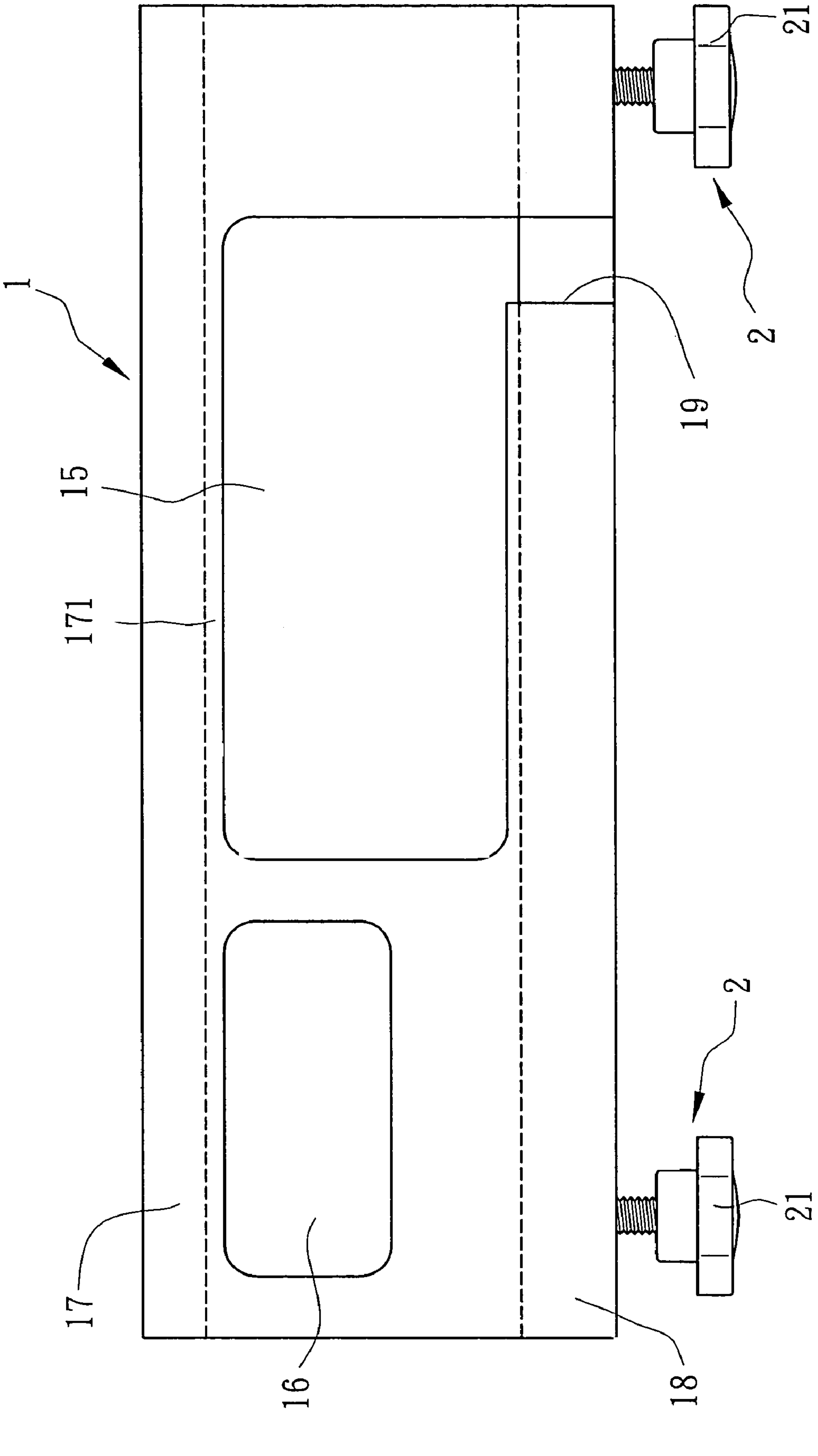
FIG. 2 is a top view of the present invention.
Figure 3:
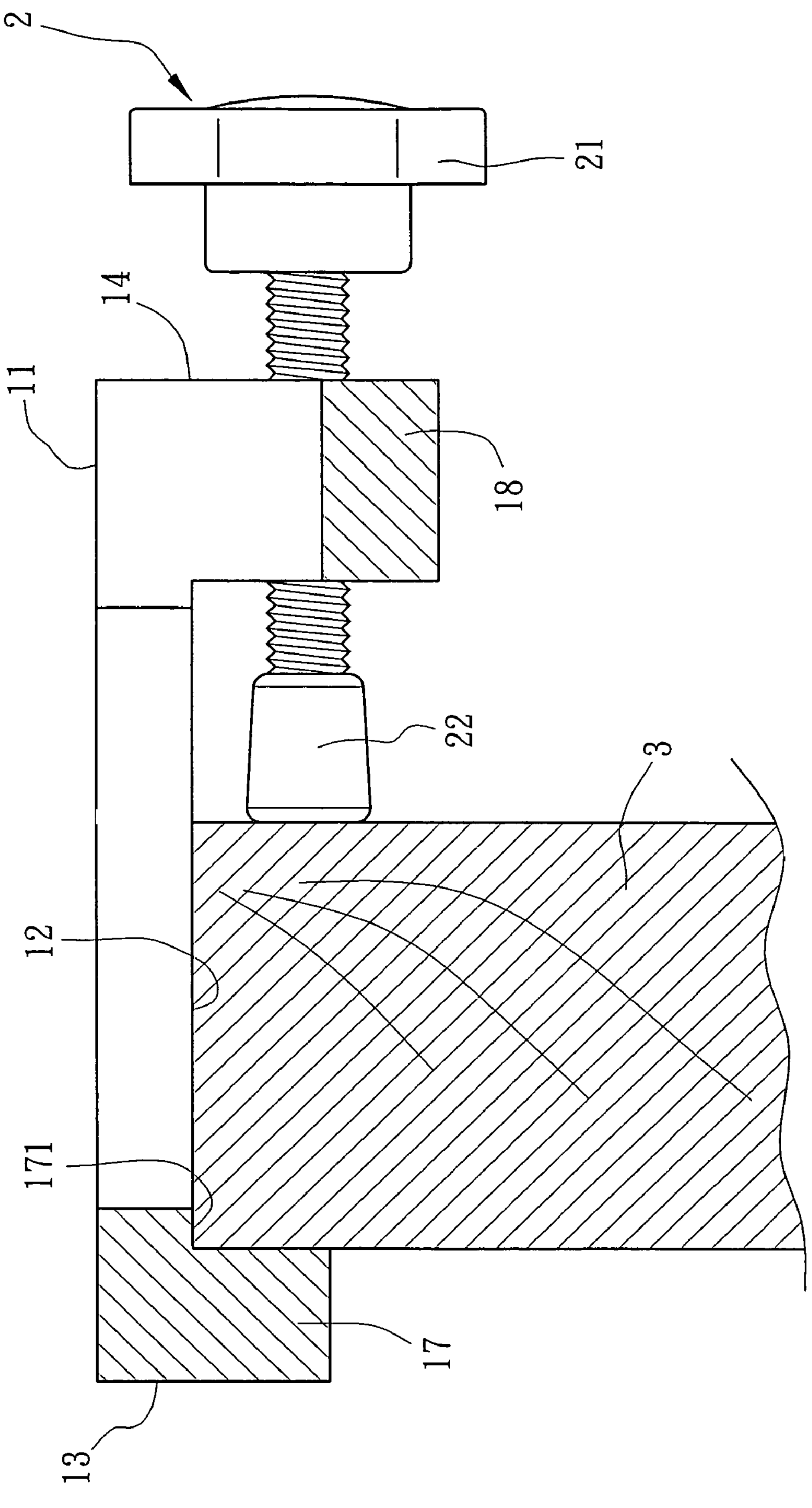
FIG. 3 is a side view of the present invention.

Please refer to FIGS. 1 to 3. The decoration-used mold unit of the present invention serves to define a range of a sink of a door board for a bolt and a door lock.

The decoration-used mold unit includes an elongated rectangular main body 1 having a top face 11 and a bottom 12 opposite to the top face 11. The main body 1 also has a first side 13 and a second side 14 opposite to each other. The top and bottom faces 11, 12 are bridged between the first and second sides 13, 14. The main body 1 is formed with a first window 15 for processing a sink for a bolt and a second window 16 for processing a sink for a door lock. The first window 15 has a sidewall 151 perpendicular to the bottom face. The second window 16 has a sidewall 161 perpendicular to the bottom face. A first chucking section 17 protrudes from the bottom face 12 in a position adjacent to the first side 13. A width 171 is reserved between the sidewalls 151, 161 and the first chucking section 17. A second chucking section 18 protrudes from the bottom face 12 in a position adjacent to the second side 14. The second chucking section 18 is formed with a notch 19 communicating with the first window 15. In addition, two abutting members 2 are screwed through the second chucking section 18. Each abutting member 2 includes a rotary button 21 for adjusting the position of the abutting member 2 and a head section 22 opposite to the rotary button 21. The first chucking section 17 and the head sections 21 of the abutting members 2 respectively abut against two opposite sides of the door board 3 to fix the main body 1 with the door board 3.

In milling, the bottom face 12 of the main body 1 is placed on the door board 3 in a position where the door board is to be processed. Then the rotary buttons 21 are turned to press the head sections 22 of the abutting members 2 against a lateral side of the door board 3. The first chucking section 17 and the head sections 22 of the abutting members 2 respectively abut against two opposite sides of the door board 3 to clamp the door board 3. Then the back of the chisel is leant against the sidewall 151 of the first window 15 to one chisel by one chisel cut the door board 3 along the periphery of the first window 15 so as to form a border of the sink for the bolt. Then the above procedure is repeated. The back of the chisel is leant against the sidewall 161 of the second window 16 to chisel the border of the sink for the door lock.

Accordingly, in the processing procedure, the chisel is restricted within the first and second windows 15, 16 so that the door board 3 will not be over-milled and the borders of the sinks for the bolt and the door lock can keep straight.

Figure 4:
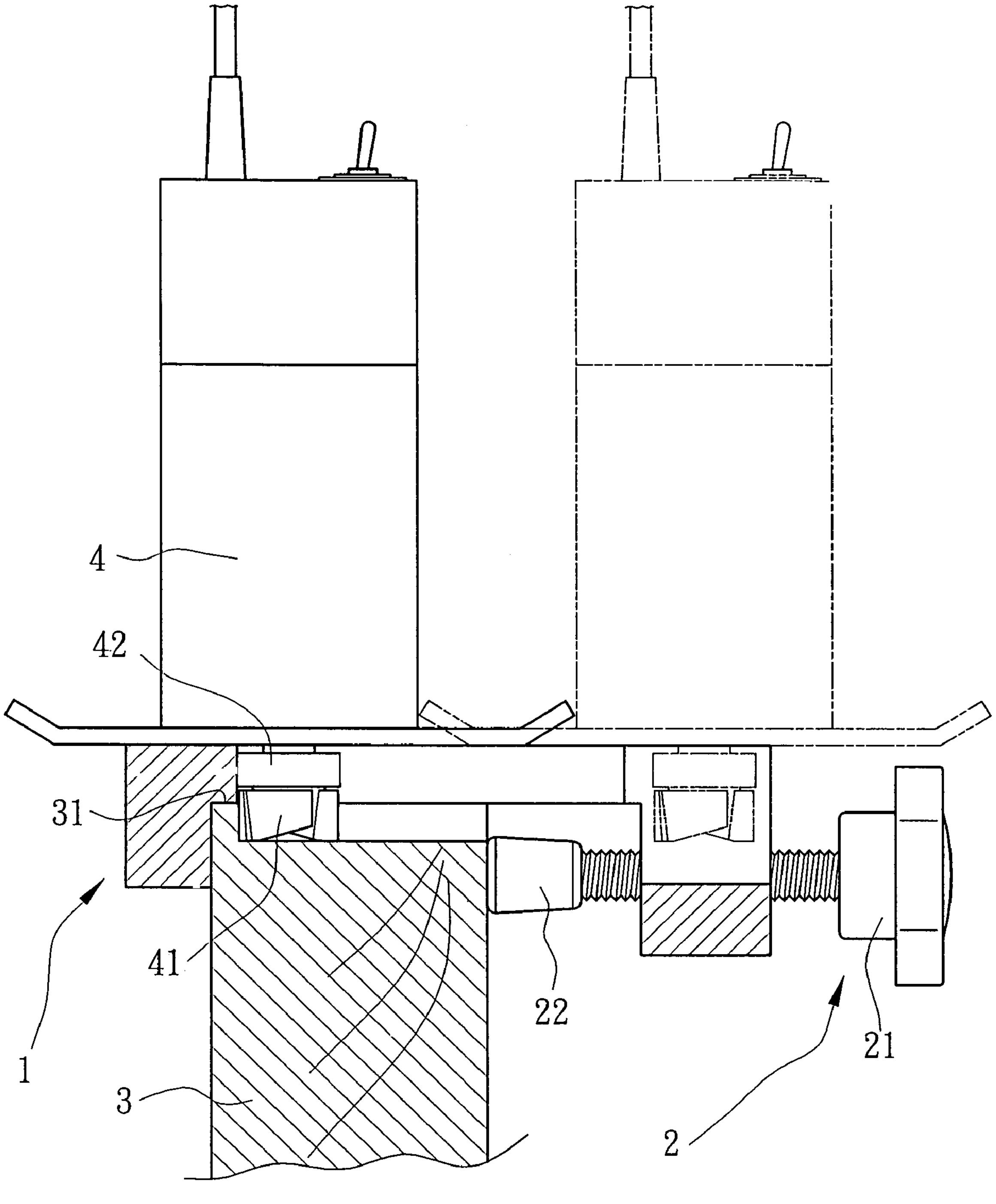
FIG. 4 shows that a door board is clamped by the present invention.
Figure 5:
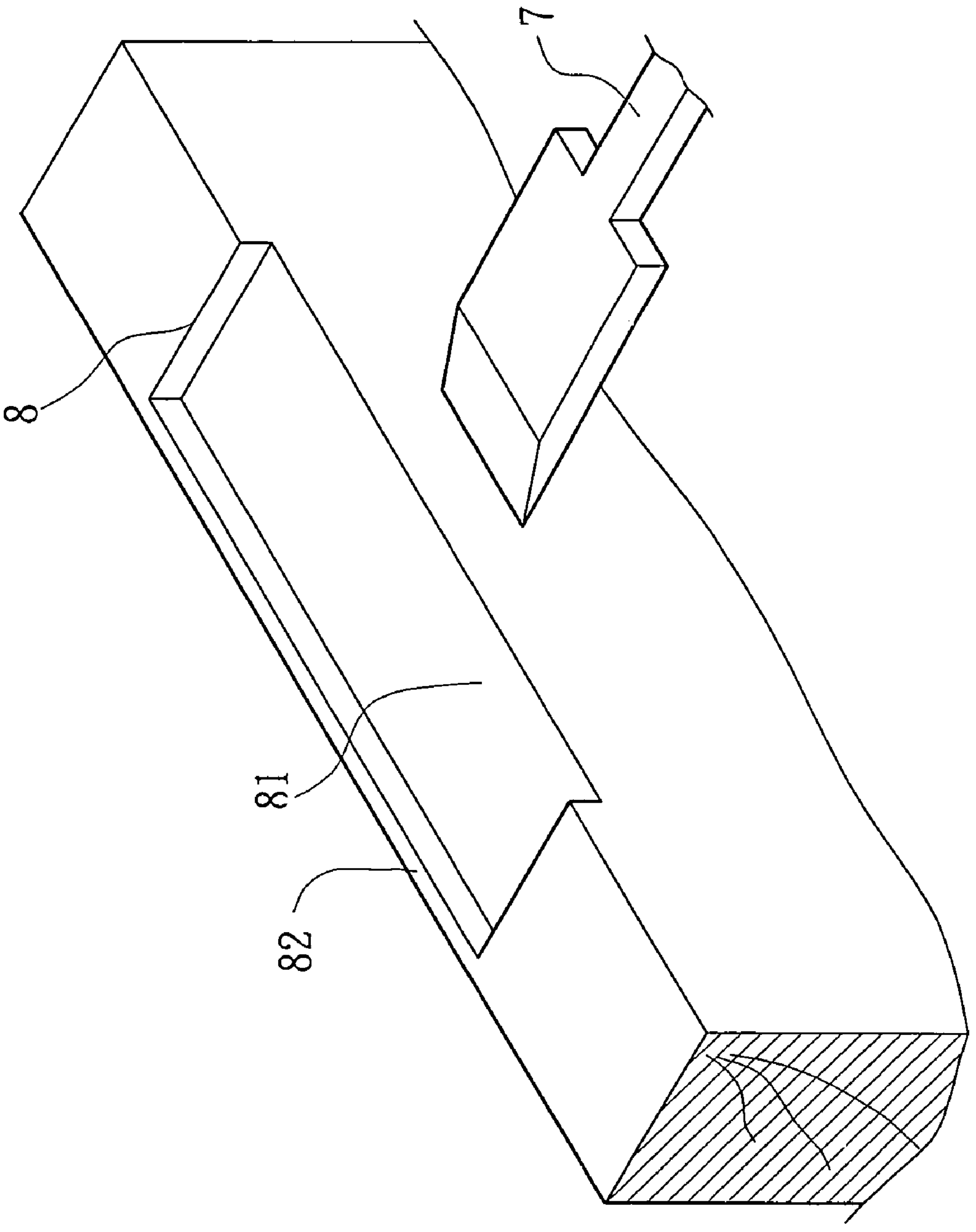
FIG. 5 PRIOR ART
FIG. 5 is a perspective view showing that a chisel is used to chisel a wooden door board to form a desired sink for mounting a door lock or a bolt.

FIG. 4 shows a second embodiment of the present invention, which further includes an abutment member installable on the blade 41 of an electric or a pneumatic miller 4. In this embodiment, the abutment member is a bearing 42. In cutting or milling, the bearing 42 abuts against the sidewall 151 of the first window 15 to cut the sink for the bolt. Also, the bearing 42 can abut against sidewall 161 of the second window 16 to cut the sink for the door lock.

In operation, the bottom of the electric miller 4 is placed on the top face 11 of the main body 1. The blade 41 of the electric miller 4 is guided through the notch 19 to the sidewall 151 of the first window 15. With the bearing 42 leant against the sidewall 151, the blade 4 can cut the sink for the bolt.

The bearing 42 has a width slightly larger than the width of the blade 41. Therefore, in the milling operation, the blade 41 of the electric miller 4 will not touch the sidewall 151 of the first window 15. Also, after processed, the bottom of the sink has a plane face. The blade 41 of the electric miller 4 is only movable within the first and second windows 15, 16 of the main body with the width 171 reserved. The processing efficiency is enhanced and the quality of the product is promoted.

The above embodiments are only used to illustrate the present invention, not intended to limit the scope thereof. Many modifications of the above embodiments can be made without departing from the spirit of the present invention.

What is claimed is:

1. A decoration-used mold unit for defining a border on a work piece to facilitate cutting or milling, said mold unit comprising an elongated rectangular main body having a top face and a bottom face opposite to the top face, the main body also having a first side and a second side opposite to each other, the top and bottom faces being bridged between the first and second sides, the main body being formed with a first window for processing a first sink and a second window for processing a second sink, a first chucking section protruding from the bottom face in a position adjacent to the first side, a second chucking section protruding from the bottom face in a position adjacent to the second side, the second chucking section and the top face being formed with a common cutting blade access notch communicating with the first window for providing access of the first window to a cutting blade, at least one abutting member being screwed through the second chucking section; the first chucking section and the abutting member respectively abutting against two opposite sides of the work piece to fix the main body with the work piece.

2. The decoration-used mold unit as claimed in claim 1, wherein the first window has a sidewall perpendicular to the bottom face and the second window also has a sidewall perpendicular to the bottom face.

3. The decoration-used mold unit as claimed in claim 1, wherein the first window is for processing a sink for a bolt, while the second window is for processing a sink for a door lock.

4. The decoration-used mold unit as claimed in claim 3, wherein the at least one abutting member includes a rotary button for adjusting the position of the at least one abutting member and a head section opposite to the rotary button, whereby the first chucking section and the head section of the at least one abutting member respectively abut against the two opposite sides of the workpiece to fix the main body with the work piece.

5. The decoration-used mold unit as claimed in claim 1, further comprising an abutment member installable on a blade of an electric or a pneumatic miller.

6. The decoration-used mold unit as claimed in claim 5, wherein the abutment member is a bearing.

* * * * *